H. E. SMYTHE.
FURNACE.
APPLICATION FILED NOV. 11, 1914.
1,165,725.
Patented Dec. 28, 1915.
3 SHEETS—SHEET 1.
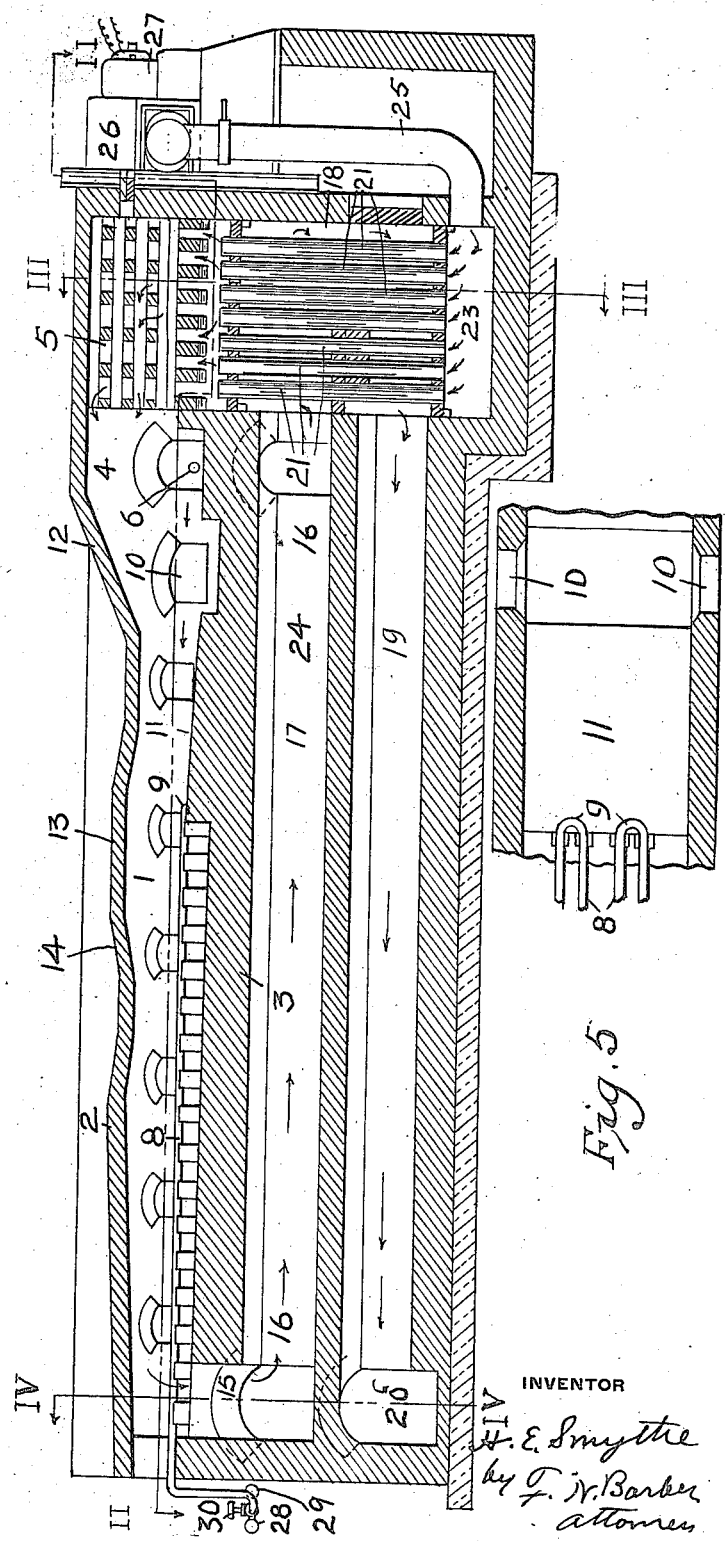
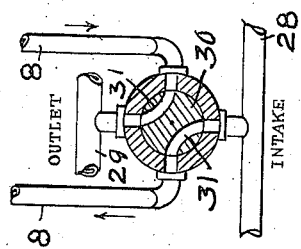

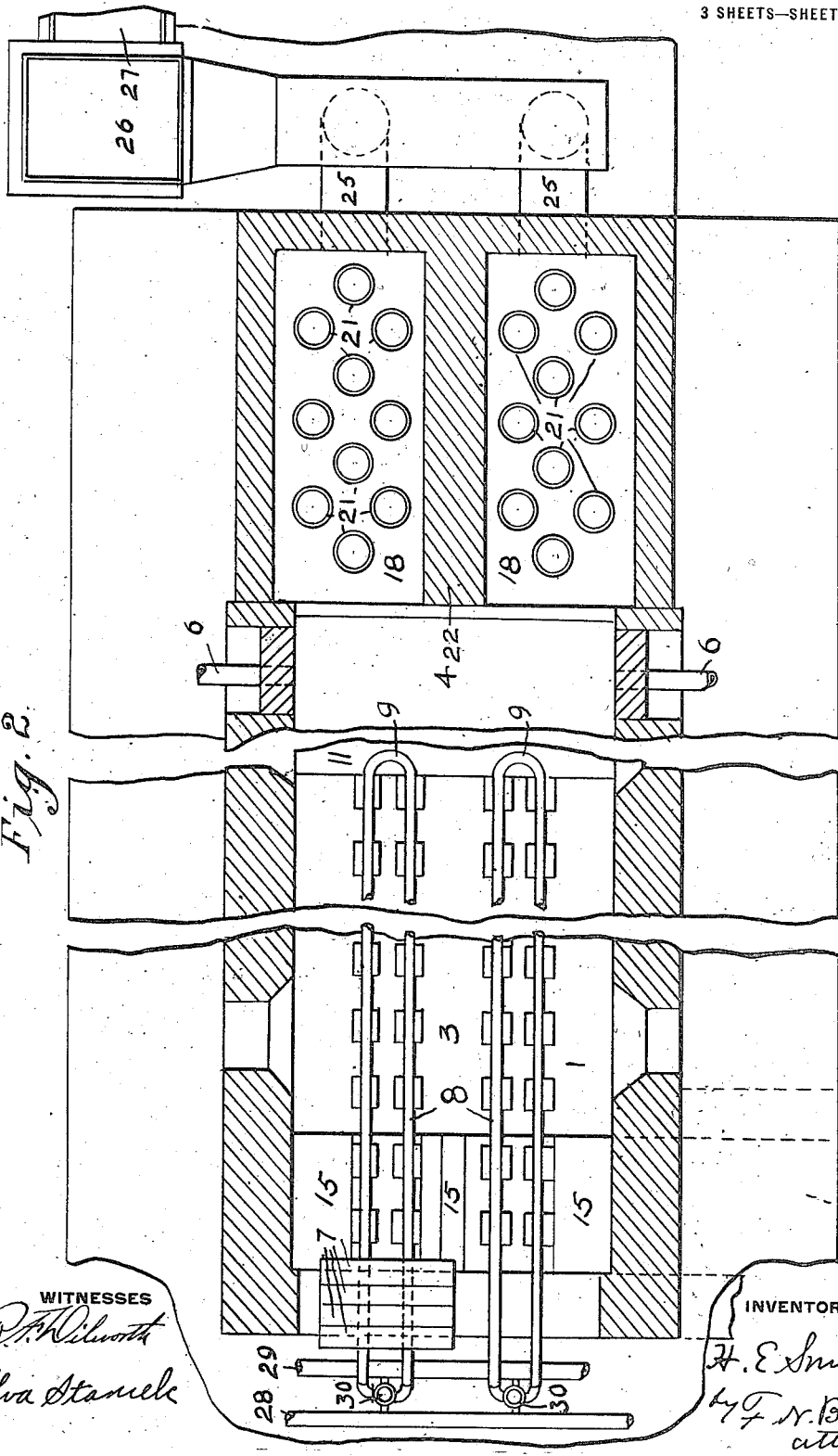

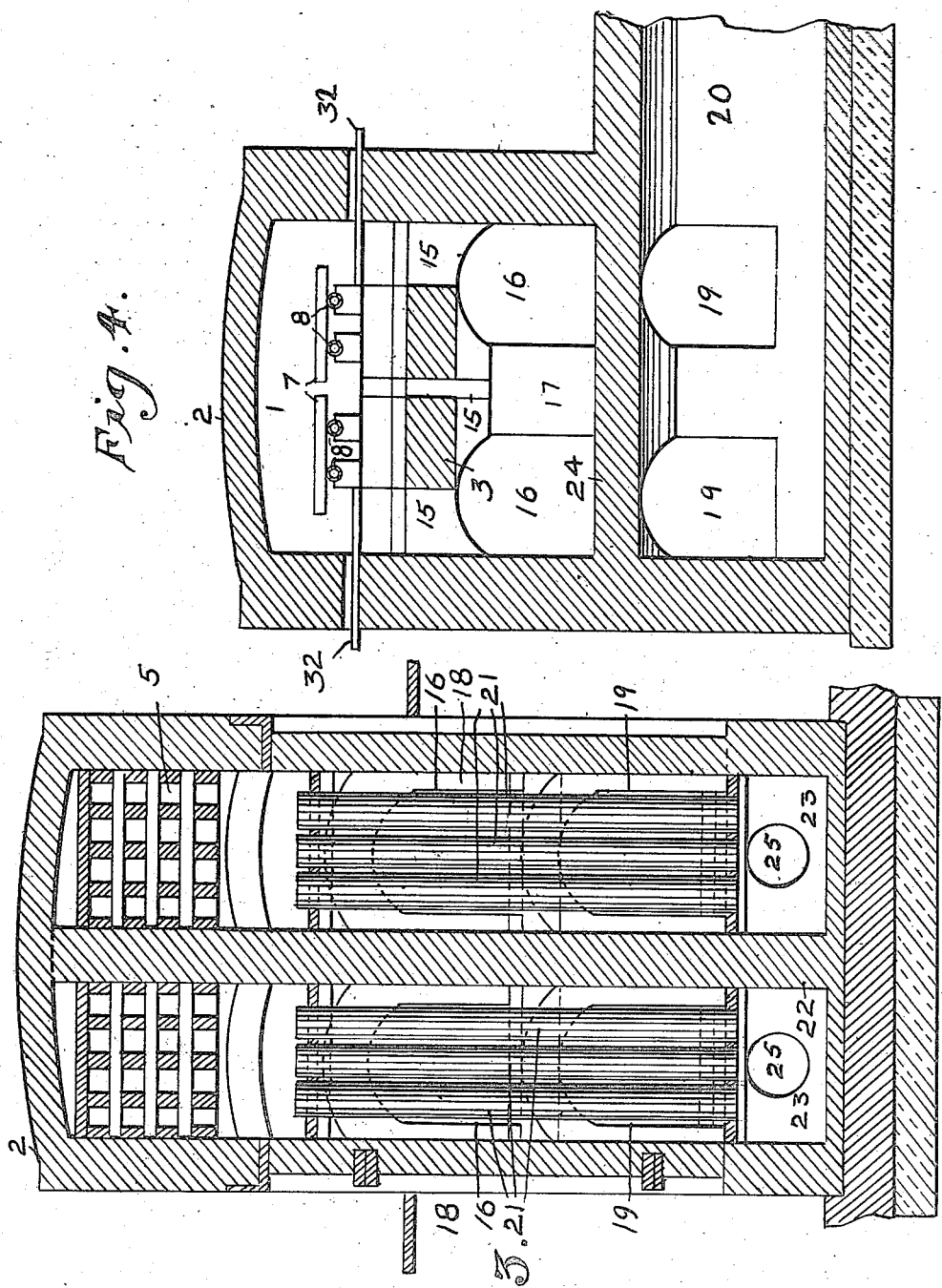

UNITED STATES PATENT OFFICE.

HORACE E. SMYTHE, OF PITTSBURGH, PENNSYLVANIA, ASSIGNOR TO THE S. R. SMYTHE COMPANY, OF PITTSBURGH, PENNSYLVANIA, A CORPORATION OF WEST VIRGINIA.

FURNACE.

1,165,725. Specification of Letters Patent. Patented Dec. 28, 1915.

Application filed November 11, 1914. Serial No. 871,491.

*To all whom it may concern:*

Be it known that I, HORACE E. SMYTHE, a citizen of the United States, residing at Pittsburgh, in the county of Allegheny and State of Pennsylvania, have invented new and useful Improvements in Furnaces, of which the following is a specification.

My invention relates to furnaces. I have illustrated my invention applied to a continuous heating furnace designed for the heating of billets, slabs, or the like, preparatory to their treatment in rolling mills, but some features thereof have a wider application.

The objects of my invention are to provide a double pass of the hot waste gases about the pipes which conduct the air to the combustion chamber; and to provide checkerwork to atomize or break up the air so as to admit it to the combustion chamber at a large number of places, whereby the fuel gas intimately mixes with the air and insures a more perfect combustion.

Other objects are to deflect the burning gas at a number of places in the furnace into contact with the metal therein, and to provide means for removing from the metal to be rolled the cooled lines produced by its travel on water-cooled pipes in the furnace.

Other objects will appear hereinafter.

Referring to the accompanying drawings, Figure 1 is a longitudinal vertical section through a furnace embodying the principles of my invention; Fig. 2, a horizontal section on the line II—II of Fig. 1; Fig. 3, a transverse vertical section on the line III—III of Fig. 1; Fig. 4, a transverse vertical section on the line IV—IV of Fig. 1; Fig. 5, a plan of a portion of the furnace hearth; and Fig. 6, a detail partly in cross-section and partly in elevation, showing means for reversing the circulation of water in the pipes on which the metal travels in the furnace.

On the drawings, 1 designates the furnace chamber having the reverberatory roof 2 and the hearth or floor 3. The forward portion 4 of the furnace chamber constitutes the mixing chamber of preliminary combustion chamber, air being admitted to the rear end thereof through the checkerwork 5 and fuel gas being admitted to the sides thereof through the pipes 6. The checkerwork causes the air to enter the chamber 4 in many fine streams which cover practically the entire rear end of the chamber. The air which therefore enters the combustion chamber in a practically even distribution is intimately mixed with the fuel gas which it encounters, thereby insuring a large economy in the use of the gas and an increased quantity of heat. I do not limit my invention to the employment of pipes or any definite means for supplying the chamber 4 with gas as it can be admitted in many different ways and at various places.

The metal billets 7 are fed from the rear, or left hand end of the furnace (Figs. 1 and 2), toward the chamber 4 on pairs of substantially horizontal parallel water-cooled pipes 8, each pair being preferably a single pipe having a return bend 9 at its forward end. I have shown two pairs of pipes 8, but the number of pairs may be increased or decreased. The pipes 8 terminate at some distance from the lateral openings through which the heated billets are removed. On Fig. 1 I have shown one of such openings and have marked it with the numeral 10. The hearth between the forward ends of the pipes 8 and the discharge openings 10 is made of refractory material having a continuous unbroken surface 11 over which the billets travel after leaving the pipes 8 in order that the uniform heat of the hearth surface 11 may remove the cooled lines on the under side of the billets caused by their contact with the cooling pipes.

The roof 2 over the rear portion of the chamber 4 is inclined downwardly and toward the rear of the furnace as shown at 12 to deflect the heat upon the metal on the hearth portion 11. The roof rises farther toward the rear as shown at 13 and then descends obliquely toward the rear at 14 to deflect the heat upon the billets on the pipes or tracks 8.

The waste gases descend through the flues or openings 15 in the floor at the rear end of the furnace and then pass forwardly beneath the floor 3 through the passages or flues 16, separated by the longitudinal partition 17 which supports the central portion of the floor 3. The forward ends of the passages 16 communicate with the upper ends of the recuperator chambers 18. From the latter chambers the waste gases descend to the lower ends of the said chamber and enter the passages or flues 19 which run to the rear end of the furnace beneath the flues 16 and communicate with the stack flue 20.

The recuperator chambers 18 are each provided with a number of vertical steel or iron pipes 21 having their upper ends opening beneath the checkerwork, which is located in two chambers separated by the vertical partition 22 separating the recuperator chambers also. The lower ends of the air pipes 21 communicate with the air receiving chambers 23, there being one of said chambers beneath each of the groups of pipes 21. The chambers 18 are gas-tight from the checkerwork chambers and from the air-receiving chambers 23. The partition 24 separating the passages 16 and 19 is extended forwardly so as to embrace about half of the pipes 21, thereby causing the waste gases from the passages 16 to pass transversely across all the pipes, then down along the forward pipes, and finally rearwardly across all the pipes, thus giving the waste gases a double pass across the pipes.

Air is delivered to the chambers 23 through the pipes 25, the air being forced by the fan 26 driven by the electric motor 27.

Water is delivered to the pipes 8 by the supply pipe 28 and taken away therefrom by the waste pipe 29. Each pair of pipes 8 is provided with a valve 30 having two passages 31 arranged to connect the supply pipe 28 to one member of the pair and the waste pipe to the other member of the pair, as shown on Fig. 6. By turning the valves a quarter revolution the connections of the supply and waste pipes to the members of each pair of pipes 8 are reversed, so that the water circulation in the pipes 8 may be reversed to equalize the cooling effect of the water in the pipes on the portions of the billets in contact therewith.

The heat in the two sides of the furnace chamber 1 is regulated by the dampers 31 (Fig. 4) which may be slid across the passages or flues 15.

I claim—

1. In a continuous heating furnace for metal in the form of billets and the like, a furnace chamber, checkerwork at one end thereof, a passage beneath the chamber for the waste gases, the said passage being connected to the chamber at the remaining end of the latter, a second passage for waste gases beneath the first passage, a recuperator chamber situated beneath the checkerwork, sealed from the checkerwork and in communication with the adjacent ends of the two passages, vertical pipes extending through the recuperator chamber, and means for feeding air through the pipes into the checkerwork.

2. In a continuous heating furnace for metal in the form of billets and the like, a furnace chamber, checkerwork at one end thereof, a passage beneath the chamber for the waste gases, the said passage being connected to the chamber at the remaining end of the latter, a second passage for waste gases beneath the first passage, a recuperator chamber situated beneath the checkerwork, sealed from the checkerwork and in communication with the adjacent ends of the two passages, vertical pipes extending through the recuperator chamber, means for feeding air through the pipes into the checkerwork, and means for causing the gases to have a double pass across the pipes.

Signed at Pittsburgh, Pa., this 9th day of November, 1914.

HORACE E. SMYTHE.

Witnesses:
ALICE E. DUFF,
F. N. BARBER.